United States Patent [19]

Kishi et al.

[11] Patent Number: 4,701,686
[45] Date of Patent: Oct. 20, 1987

[54] LINE TRACKING CONTROL METHOD

[75] Inventors: Hajimu Kishi; Shinsuke Sakakibara; Takayuki Ito, all of Hino, Japan

[73] Assignee: Fanuc Ltd., Minamitsuru, Japan

[21] Appl. No.: 860,198

[22] PCT Filed: Aug. 16, 1985

[86] PCT No.: PCT/JP85/00455
§ 371 Date: Apr. 24, 1986
§ 102(e) Date: Apr. 24, 1986

[87] PCT Pub. No.: WO86/01450
PCT Pub. Date: Mar. 13, 1986

[30] Foreign Application Priority Data

Aug. 24, 1984 [JP] Japan .................................. 59-175155

[51] Int. Cl.[4] .......................................... G05D 23/275
[52] U.S. Cl. ..................................... 318/632; 318/561; 318/571; 318/85; 318/39
[58] Field of Search ............... 901/7; 318/568 H, 568, 318/632, 561, 571, 85, 39, 615, 616, 617, 618, 66, 77; 364/478

[56] References Cited

U.S. PATENT DOCUMENTS

| 30,016 | 5/1979 | Hohn | 901/7 |
| 4,091,315 | 5/1978 | Hayashi | 318/632 |
| 4,423,365 | 12/1983 | Turner | 318/561 |

Primary Examiner—Bernard Roskoski
Assistant Examiner—Patrick C. Keane
Attorney, Agent, or Firm—Staas & Halsey

[57] ABSTRACT

A line tracking control method of controlling a robot (51) to cooperate with a conveyor (50) in its movement determines a speed of movement of the conveyor (50) as a constant, determines a corrective variable (d) based on the determined conveyor speed, finds a boundary value (B) for the speed of the conveyor (50), compares the boundary value with an actual speed of the conveyor (50), and adding or subtracting the corrective variable (D) based on the result of comparison, thus determining a command value for the robot.

4 Claims, 7 Drawing Figures

LINE TRACKING CONTROL METHOD

BACKGROUND OF THE INVENTION

The present invention relates to a line tracking control method for enabling a robot to cooperate with a workpiece moving on a conveying device such as a conveyor.

Manual operations on production lines are being replaced with industrial robots in recent years. The manual operation can perform a cooperative job matching a particular workpiece on a production line based on the sophisticated abilities of a human being to collect and process information. However, various technical measures should be taken in controlling a robot which is employed as a substitute for a human being. For example, it has been difficult to control the hand of a robot so as to attend appropriately a workpiece moving on a conveying device such as a conveyor. Generally, where an industrial robot is used on a production line, the robot starts moving in a tracking direction at the time a tracking start signal is applied to the robot, and the robot moves at the same speed as that of the conveying device while working on the workpiece on the conveying device.

The robot starts moving in the tracking direction when supplied with the tracking start signal as shown in FIG. 4 of the accompanying drawings. At this time, the conveying device has already reached a certain speed Vc in the tracking direction as illustrated in FIG. 3. Since the robot starts from the zero speed, it is delayed with respect to the speed of the conveyor by a time constant $\tau$ indicated as a gradient. Theoretically, the delay is not eliminated unless the time constant is zero. For those robots which have large inertia, the delay cannot be neglected since the time constant is large. This situation is explained in FIG. 5 in which designated at TP is a conveying device such as a conveyor, RB an industrial robot, WP a workpiece, lc a commanded distance, and T1 a delay that the robot suffers in following the workpiece. As is apparent from FIG. 5, when the robot RB is supplied with a tracking start signal as the workpiece WP passes thereby, the robot RB starts moving in the tracking direction in order to grip the worpiece WP. However, since there is a delay T1 between the robot RB and the workpiece WP, the robot RB is unable to grip the workpiece WP.

To compensate for the delay, there has been proposed a system for applying, to a robot, a control signal which includes a variable added to the rate of movement of the conveyor, the variable being commensurate with the robot delay.

FIGS. 6 and 7 are diagrams illustrative of such a system. Denoted at t is a time, Vr is a robot speed, CV a corrective variable for compensating for the robot delay with respect to the workpiece, the corrective variable being indicated as a shaded area.

Since the robot delay=(conveyor speed)×(time constant)/2, the speed of the conveyor is monitored from time to time, and the corrective variable is varied from time to time to meet the conveyor speed. More specifically, the corrective variable is expressed by $$d = (l/t) \times \tau \times (\tfrac{1}{2}) \qquad (1)$$

where t is the sampling period, l the distance of movement in the sampling period, and $\tau$ the time constant of the robot. If the corrective variable in the ith sampling period is smaller than that in the preceding (i−1)th sampling period, then the difference therebetween is added in i (ith sampling period). If the corrective variable in the ith sampling period is larger than that in the preceding sampling period, then the difference is subtracted. Thus, the ith commanded distance l for the robot is:

$$l = li + di - di - 1 \qquad (2)$$

With the aforesaid system, the robot that starts moving from the stopped condition with respect to the conveying device that has already been moved can be controlled without a delay with respect to the conveying device.

Since, however, the above control system effects a delay compensation for every variation in the speed of the conveying device or conveyor, it has the following problem:

It is assumed that the conveyor speed varies slightly, and the distance of movement in the sampling period t (which is regarded as being constant for the sake of brevity) changes from l to l+δ. By putting the value l+δ in the equation (2), we get $$(l + \delta) + \left[ \frac{l + \delta}{t} \times \tau \times \tfrac{1}{2} \right] - \left[ \frac{l}{t} \times \tau \times \tfrac{1}{2} \right] =$$

$$(l + \delta) + \delta \times \frac{\tau}{t} \times \tfrac{1}{2}$$

This means that when an input from the conveyor is varied by δ, then the command to the robot is varied by:

$$\delta \times \left[ 1 + \frac{\tau}{2t} \right]$$

Generally, $\tau > t$, and for a system in which the sampling period is short, i.e., which has good sensitivity, $\tau/2t$ is increased. The conventional control system tends to amplify small variations in the speed of the conveyor. This is problematic since the robot is adversely affected such as by vibration.

SUMMARY OF THE INVENTION

The present invention has been made in an effort to solve the problem with the conventional line tracking control method based on a finding that the speed of movement of a conveying device such as a conveyor on a conveyor line in an actual factory is substantially constant though the speed may be slightly variable. It is an object of the present invention to provide a line tracking control method capable of preventing a robot from being adversely affected such as by vibration due to corrective control by setting a corrective variable for the delay of the robot with respect to a conveying device to a constant value, so that smooth cooperative operation can be achieved by the conveying device and the robot.

According to the present invention, there is provided a line tracking control method of controlling a robot with a control device so as to meet the speed of movement of a conveying device, the control device being operable in:

(1) the first step of determining the speed of movement of the conveying device as a constant and storing the same;

(2) the second step of determining a corrective variable and setting a boundary value for the speed of movement of the conveying device based on the speed of movement of the conveying device which is determined in the first step; and (3) the third step of comparing the boundary value determined in the second step with an actual speed of movement of the conveying device and adding or subtracting the corrective variable based on the result of comparison, thus determining a command value for the robot.

The present invention enables the robot to cooperate smoothly with the conveying device without suffering from vibration or the like which would be produced by the corrective operation.

Other objects and features of the present invention will be apparent from the following description of the invention.

DESCRIPTION OF THE PREFERRED EMBODIMENT

The present invention will hereinafter be described in specific detail with reference to an embodiment shown in FIGS. 1 and 2.

Figure 1:
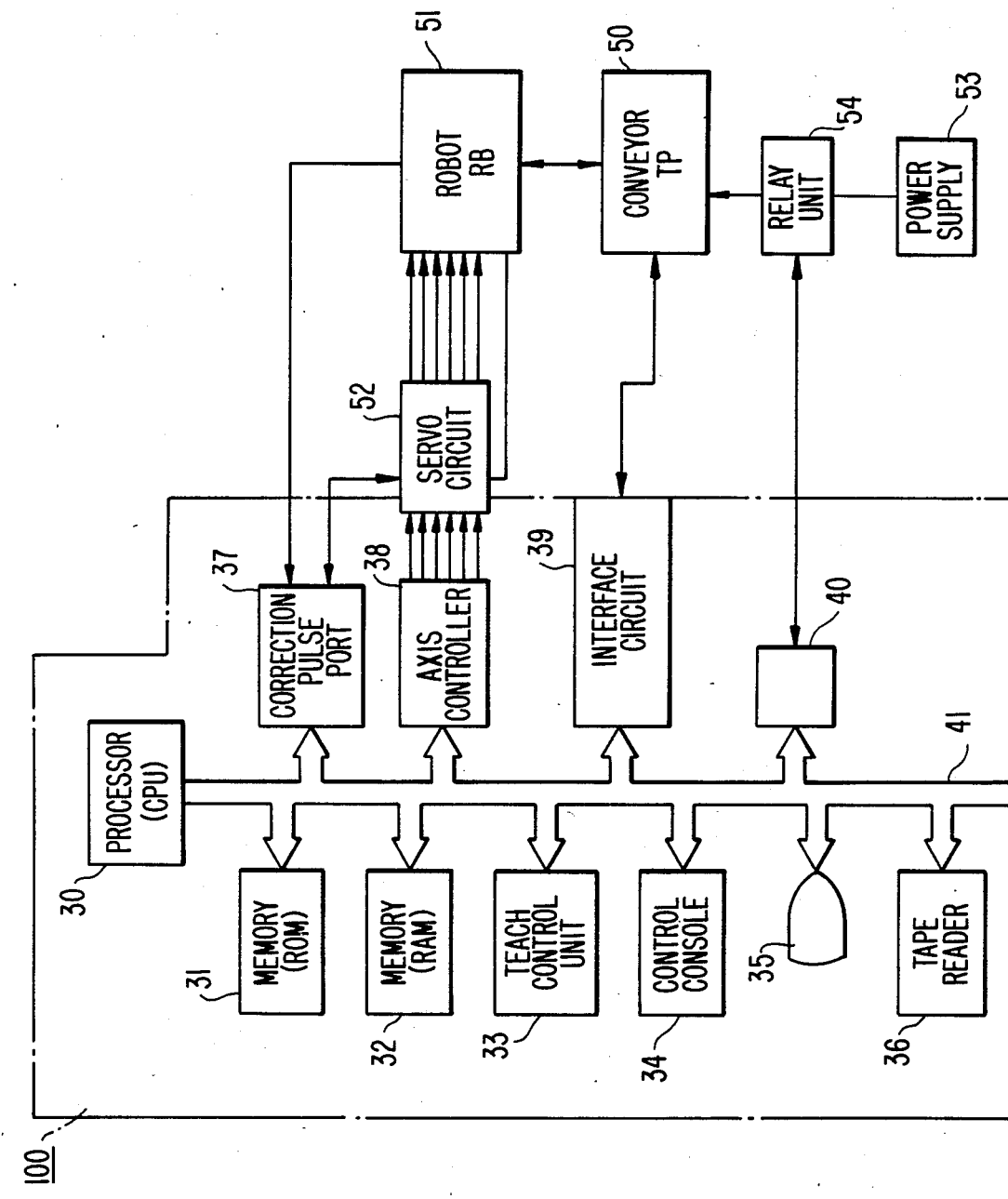
FIG. 1 is a block diagram of a robot control system for carrying out a line tracking control method according to the present invention.

FIG. 1 is a block diagram of a robot control system for carrying out a line tracking control method according to the present invention. The robot control system has a numerical control device incorporating a microcomputer (CNC) 100 for controlling a conveying device 50 such as a conveyor and a robot 51 for working on a workpiece placed on the conveyor 50. The numerical control device 100 includes a processor (CPU) 30, a program memory (ROM) 31 comprising a read-only memory, a data memory (RAM) 32 comprising a random-access memory, a teach control unit 33, a control console 34, a CRT display 35, a tape reader 36, a correction pulse port 37, an axis controller 38, an interface circuit 39, an input/output circuit 40, and an address data bus 41 interconnecting these components. The CPU 30 effects arithmetic operations according to a control program for controlling the conveyor 50 and the robot. The ROM 31 stores various control programs to be executed by the CPU 30. The RAM 32 stores data applied by the teach control unit 33, the control console 34, the tape reader 36, the interface circuit 39, and the input/output circuit 40, and arithmetic results and data from the CPU 30. The axis controller 38 is responsive to output signals from the CPU 30 for applying control signals to a servo circuit 52 which controls drive sources for a plurality of axes, the axis controller 38 includes an interpolator. The correction pulse port 37 applies corrective pulses to the servo circuit based on the corrective operation of the CPU 30. The interface circuit 39 delivers a signal to and receives a signal from the conveyor 50. The input/output circuit 40 delivers a signal to and receives a signal from a relay unit 54 for controlling the supply of electric power from a power supply 53 to the conveyor 50.

Figure 2:
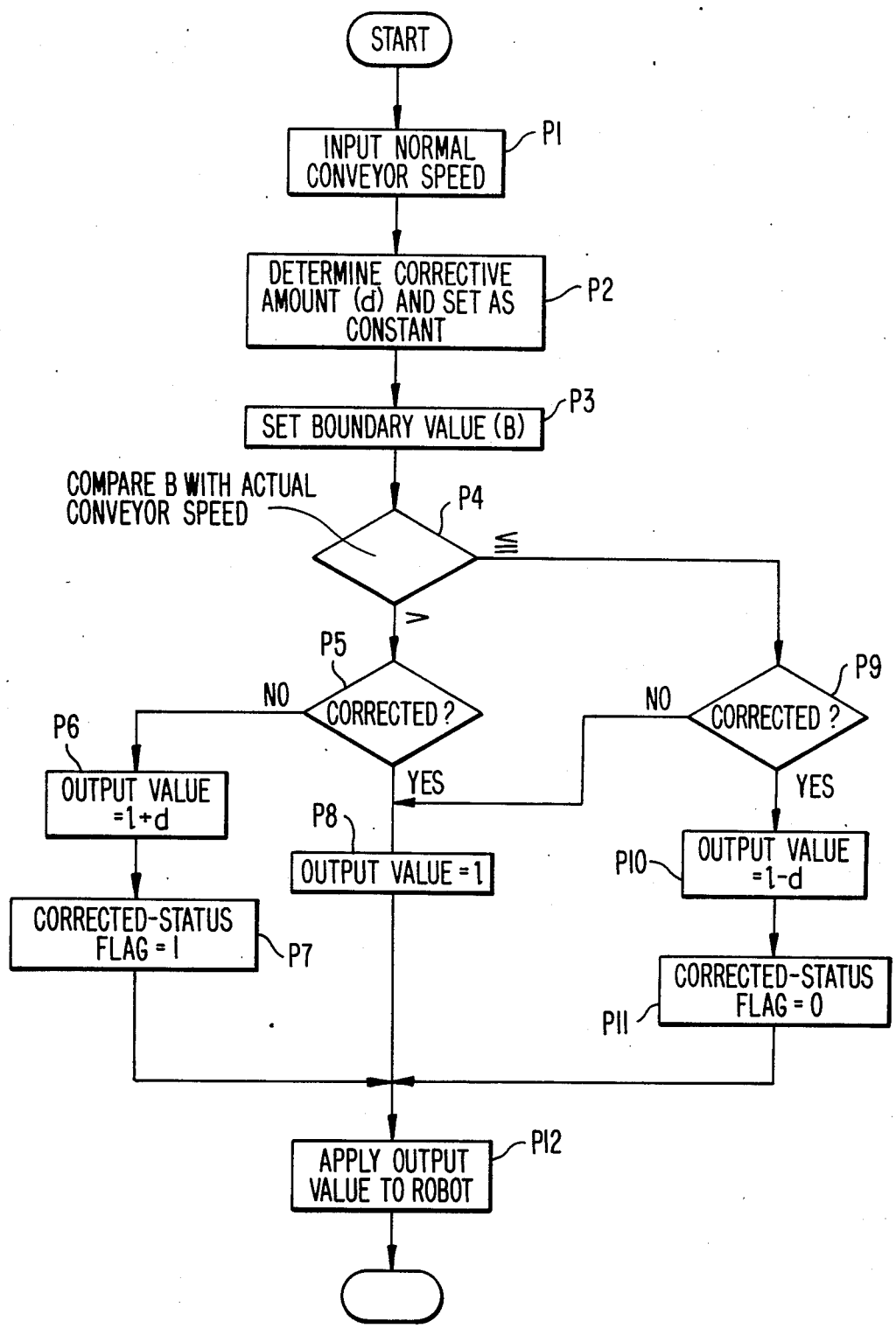
FIG. 2 is a flowchart of line tracking control according to the present invention.
Figure 3:
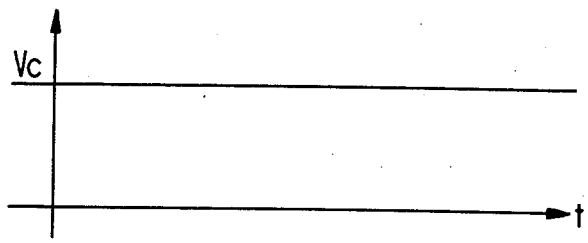
FIG. 3 is a diagram explanatory of the relationship between the speed of a conveying device and time.
Figure 4:
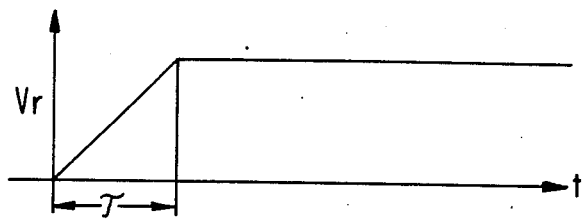
FIG. 4 is a diagram explanatory of the relationship between the command speed for a conventional robot and time.
Figure 5:
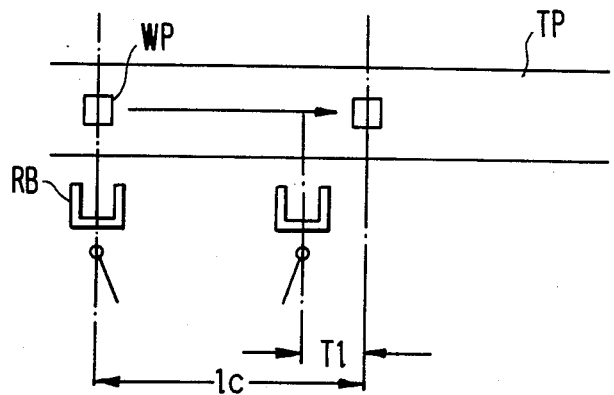
FIG. 5 is a diagram explanatory of the conventional relationship between the movement of a conveying device and a robot.
Figure 6:
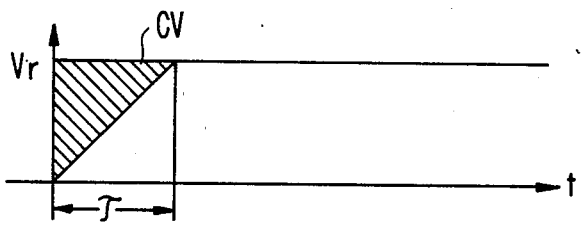
FIG. 6 is a diagram explanatory of the relationship between the command speed for a robot and time.
Figure 7:
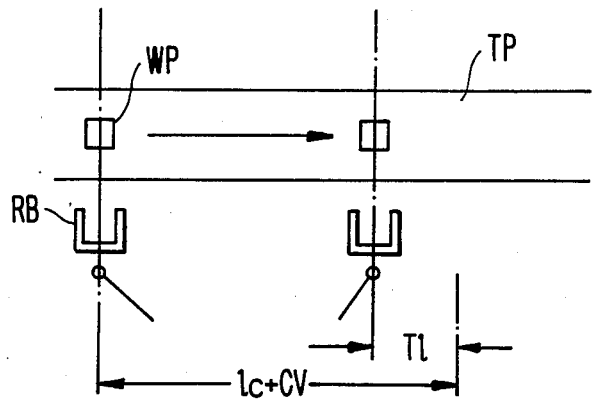
FIG. 7 is a diagram explanatory of the relationship between the movement of a conveying device and a robot.

FIG. 2 is a flowchart explaining the operation sequence of the line tracking control method of the invention. The present invention will hereinafter be described in detail with reference to FIG. 2.

(1) The numerical control device 100 applies a normal speed of the conveyor 50 (step P1). Since the normal speed of the conveyor 50 is usually determined when the system is set, the speed is applied through the control console 34 and stored in the RAM 32 by the CPU 30. The normal speed of the conveyor 50 may be determined as (V) by detecting the distance (l) of movement of the conveyor 50, inputting the distance through the interface circuit 39, and dividing the distance (l) by time (t) in the CPU.

(2) Then, the CPU 30 determines a corrective variable (d) based on the normal speed (V) according to the equation (1), i.e., $d = (l/t) \times \tau \times (\frac{1}{2})$, sets the corrective variable (d) as a constant, and stores it in a parameter area in the RAM 32 (step P2).

The time constant $\tau$ of the robot 51 is stored in advance in the RAM 32. The CPU effects the computation of the corrective variable (d) by reading out the data of the time constant.

(3) Then, the CPU 30 sets a boundary value (B) as $(\frac{1}{2})$V, for example, and stores it in the parameter area in the RAM 32 in order to ascertain whether the conveyor 50 is at rest or is moving at a constant speed (step P3).

(4) The CPU 30 compares the actual speed of the conveyor 50 which is input through the interface circuit 39 and the boundary value (B) (step P4).

(5) If the actual speed of the conveyor 50 is higher than the boundary value (B) in the step P4, then the CPU 30 applies an output (l+d) in which the corrective variable (d) is added as a command to the robot (step P6) if [1] correction has not been effected (step P5), and sets a corrected-status flag to 1 (step P7). If [2] correction has been effected (step 5), the CPU 30 applies an output (l) in which the corrective variable (d) is not added as a command to the robot (step P8). The output (l) is applied via the axis controller 38 to the servo circuit 52, and the corrective variable (d) is applied through the correction pulse port 37 to the servo circuit 52.

(6) If the actual speed of the conveyor 50 is equal to or smaller than the boundary value (B) in the step P4, i.e., if the conveyor 50 is about to stop, then the CPU 30 subtracts the corrective variable (d) from the distance and applies an output (l−d) to the robot (step P10) if [1] the correction of the step (5) is effected (step P9), and the corrected-status flag is set to 0 (step P11). If the correction of the step (5) is not effected, the output (l) is applied to as a command to the robot (step P8) (step P12).

The control method of the invention is based on a finding that the speed of movement of the conveyor 50 is substantially constant though it is slightly variable. Therefore, the speed of the conveyor is regarded as a constant, and the corrective variable (d) is determined on the basis of the constant conveyor speed. As a result, the robot is prevented from being adversely affected as by vibration which would be caused by tracking correction based on the detection of each slight variation in the speed of the conveyor. The control method of the invention is simper than the prior art and highly advantageous in the practice.

Although a certain preferred embodiment has been shown and described, it should be understood that many changes and modifications may be made therein without departing from the scope of the appended claim.

The present invention is suitable for use in the control of a robot to be arranged on a conveyor line or the like since it can control the robot smoothly in coordinated relationship to the movement of a conveying device.

What we claim is:

1. A line tracking control method of controlling a robot with a control device to match a speed of movement of a conveying device, the line tracking control method comprising:
    (a) determining a single time the speed of movement of the conveying device as a constant and storing the constant;
    (b) determining a single time a corrective value and setting a boundary value for the speed of movement of the conveying device based on the speed of movement of the conveying device determined in step (a); and
    (c) comparing the boundary value determined in step (b) with an actual speed of movement of the conveying device and adding or subtracting said corrective value based on the result of comparison, thus determining a command value for the robot.

2. A method as recited in claim 1, wherein the third step (c) comprises the steps of:
    (i) comparing the boundary value to the actual speed;
    (ii) adding the corrective value a single time to a normal speed of movement if the actual speed is greater than the boundary value and if the normal speed has not been corrected; and
    (iii) subtracting the corrective value from the normal speed if the actual speed is less than or equal to the boundary value and if the normal speed has been corrected.

3. A line tracking control method for a robot comprising the steps of:
    (a) detecting a conveyor speed and storing the conveyor speed as a speed constant;
    (b) determining a speed correction from the speed constant and storing the speed correction as a speed correction constant;
    (c) determining a boundary value from the speed constant;
    (d) comparing the boundary value to a conveyor actual speed;
    (e) producing a first corrected speed by adding the speed correction constant to a normal speed of the robot a single time when the first corrected speed has not been produced and the actual speed is greater than the boundary value; and
    (f) maintaining the normal speed when the corrected speed has been produced and the actual speed is greater than the boundary value.

4. A method as recited in claim 3, further comprising the step of:
    (g) producing a second corrected speed by subtracting the speed correction constant from the normal speed a single time when the first corrected speed has been produced and when the actual speed is less than or equal to the boundary value.

* * * * *